United States Patent [19]

Hahn et al.

[11] Patent Number: 4,459,373
[45] Date of Patent: Jul. 10, 1984

[54] PRE-EXPANDED PLASTIC BEADS BASED ON POLY-PARA-METHYLSTYRENE

[75] Inventors: Klaus Hahn, Kirchheim; Isidoor De Grave, Wachenheim; Rupert Schick, Limburgerhof, all of Fed. Rep. of Germany

[73] Assignee: BASF Aktiengesellschaft, Ludwigshafen, Fed. Rep. of Germany

[21] Appl. No.: 531,823

[22] Filed: Sep. 13, 1983

[30] Foreign Application Priority Data

Sep. 18, 1982 [DE] Fed. Rep. of Germany ....... 3234664

[51] Int. Cl.³ ............................. C08J 9/18; C08J 9/20
[52] U.S. Cl. ......................................... 521/56; 521/60
[58] Field of Search ................................... 521/56, 60

[56] References Cited

U.S. PATENT DOCUMENTS 4,237,255  12/1980  Murray ............................ 525/333.5
4,242,465  12/1980  Canterino ............................ 521/88

Primary Examiner—Morton Foelak
Attorney, Agent, or Firm—Norbert M. Lisicki

[57] ABSTRACT

The invention relates to pre-expanded plastic beads based on poly-para-methylstyrene with the following properties:

(a) the bead size lies between 0.2 and 3 cm,
(b) the thermal stability, measured in accordance with DIN 53,424 is above 110° C., and
(c) the bulk density is below 35 g/l.

The corresponding expandable plastic beads are prepared through the polymerization of para-methylstyrene in an aqueous suspension with the addition of volatile organic blowing agents during or after polymerization, whereby polymerization occurs in the presence of molecular-weight-regulating substances. Typical molecular-weight-regulating substances are organic chain transfer agents with a transfer constant K between 0.1 and 50, said agents being added in amounts ranging from 0.1 percent by weight to 1 percent by weight when a yield ranging from 20 to 95 percent is reached. Oligomers of the styrene or para-methylstyrene in quantities from 0.1 percent by weight to 10 percent by weight may also be employed.

3 Claims, No Drawings

PRE-EXPANDED PLASTIC BEADS BASED ON POLY-PARA-METHYLSTYRENE

BACKGROUND OF THE INVENTION

1. Field of the Invention

The invention relates to pre-expanded plastic beads with a high dimensional thermal stability and a low bulk density based on poly-para-methylstyrene, as well as a process for the preparation of plastic beads containing a blowing agent to permit the preparation of said pre-expanded plastic beads.

2. Prior Art

The thermal stability limit of expanded polystyrene is 105° C. If such cellular materials are expanded at higher temperatures, they warp and bend. For this reason, cellular plastics have been prepared from styrene/maleic acid anhydride copolymers, which are known to have a higher thermal stability than does polystyrene. If the known technology used for the preparation of expandable polystyrene (EPS) beads is applied to the styrene/maleic acid anhydride copolymers, one finds that the corresponding expandable plastic beads exhibit a relatively low expandability when processed on conventional EPS expansion equipment; bulk densities under 35 g/l are difficult to attain, and the rates of expansion are not satisfactory.

It is known that poly-para-methylstyrene also has a higher thermal stability than polystyrene. U.S. Pat. No. 4,237,255 describes the preparation of poly-para-methylstyrene in bead form through polymerization in an aqueous suspension. U.S. Pat. No. 4,242,465 relates to the preparation of foams based on poly-para-methylstyrene through the incorporation of a blowing agent in the molten polymer and extrusion to form continuous foam sheets.

If one also attempts to apply EPS technology here, one also obtains beads with insufficient expandability. An increase in the blowing agent content, for example, from 7 percent by weight, which is standard with EPS, to 9 or 10 percent by weight, does not produce a significant reduction in bulk density; in fact, once the pre-expanded beads are fused together, shaped objects are obtained with an irregular cellular structure which tend to shrink and collapse. The expandability can be improved by the addition of conventional plasticizers, such as cumene or ethylbenzene in the preparation of poly-para-methylstyrene containing blowing agents, but this is done at the cost of lowering the thermal stability of the foams produced therefrom to temperatures under 100° C.

Thus, the purpose of the invention was to prepare pre-expanded plastic beads with an increased thermal stability which expand to lower bulk densities when they are prepared on conventional EPS processing machines.

DESCRIPTION OF THE PREFERRED EMBODIMENTS

It was found that pre-expandable plastic beads can be obtained when the polymerization of para-methylstyrene is performed in an aqueous suspension in the presence of molecular-weight-regulating substances.

The invention applies to pre-expanded plastic beads based on poly-para-methylstyrene which are characterized by the following:

(a) their particle size lies between 0.2 and 3 cm, (b) their thermal stability, measured according to DIN 53 424, is above 110° C., (c) their bulk density is below 35 g/l.

The good thermal stability achieved by the pre-expanded beads, preferably over 112° C. and more preferably between 115° C. and 120° C., results in a significant advantage in the preparation of shaped foam objects. When finished parts are produced from pre-expanded PS beads, the shaped part must be cooled to 80° C. to 85° C., while when pre-expanded beads in accordance with the invention are processed, the shaped object only needs to be cooled to 95° C. to assure that it will not subsequently change shape. This results in considerable energy savings.

When the foam parts in accordance with the invention are produced through the expansion of expandable beads in conventional EPS expansion equipment, the poly-para-methylstyrene beads containing a blowing agent exhibit good expandability. The minimum achievable bulk density is less than 35 g/l, preferably less than 30 g/l, and more preferably between 15 and 25 g/l, whereby this minimum bulk density is achieved in a relatively short time, for example, between 10 and 20 minutes.

One way to prepare the pre-expanded beads in accordance with the invention is to polymerize para-methylstyrene in the presence of molecular-weight-regulating substances. The remaining polymerization conditions do not differ from those which are standard in the preparation of polystyrene and are described, for example, in the *Kunststoff-Handbuch*, vol. V, "Polystyrol," Carl-Hanser-Verlag, pp. 679–688.

Para-methylstyrene is polymerized, in some cases together with up to 20 percent by weight comonomers, in an aqueous suspension, whereby a blowing agent is added prior to, during, or after polymerization.

The following are typically used as comonomers: styrene, α-methylstyrene, nucleus-halogenated styrenes, nucleus-alkylated styrenes, acrylonitrile, esters of acrylic or methacrylic acid with alcohols containing 1 to 8 carbon atoms, N-vinyl compounds, such as vinyl carbazol, maleic acid anhydride, or also small amounts of compounds containing two polymerizable double bonds, such as butadiene, divinylbenzene, or butanediol diacrylate. Under normal conditions, gaseous or liquid hydrocarbons or hydrogen halides which do not dissolve the poly-para-methylstyrene and whose boiling point is lower than the softening point of the polymer are suitable as typical blowing agents. Suitable blowing agents are, for example, propane, butane, pentane, cyclopentane, hexane, cyclohexane, dichlorodifluoromethane and trifluorochloromethane. The blowing agents are generally used in amounts ranging from 3 percent by weight to 10 percent by weight.

Before, during, or after the polymerization, additional standard additives can be introduced, e.g., flame retardants based on organic bromine or chlorine compounds such as trisdibromopropyl phosphate, hexabromocyclododecane, chloroparaffin, as well as substances which act synergistically with flame retardants, such as dicumyl and highly unstable organic peroxides; these additives also include antistatic agents, stabilizers, dyes, lubricants, fillers and substances which prevent clumping during pre-expansion such as zinc stearate, melamine-formaldehyde condensate or silicic acid, as well as agents to shorten the demolding time during final expansion, such as glycerin esters or esters of hydroxycarboxylic acid.

In the suspension polymerization of para-methylstyrene, the monomers are dissolved in water, whereby organic or inorganic suspension stabilizers, preferably in amounts between 0.05 percent by weight and 2 percent by weight based on the suspension, are added. The polymerization is generally performed at a temperature between 80° C. and 130° C., preferably between 100° C. and 120° C. At the start of polymerization, organic polymerization initiators such as peroxides or azo-compounds are used which break down into radicals under the influence of the heat. They are used in amounts ranging from 0.01 percent by weight to 1 percent by weight based on the monomers.

The polymerization in accordance with the invention is performed in the presence of molecular-weight-regulating substances. Styrene oligomers, for example, can be used as these molecular-weight-regulating substances in amounts ranging from 0.1 percent by weight to 10 percent by weight, preferably from 0.5 percent by weight to 5 percent by weight based on the monomers. This can take place before, during or at the end of polymerization. Styrene oligomers are known. They can be prepared, for example, through a continual thermal polymerization of styrene at an elevated pressure. Their mean molecular weight (number average) lies between 500 and 5000, preferably between 800 and 2000. As a rule, the corresponding oligomeric para-methylstyrene can also be used.

In another preferred process, 0.01 percent by weight to 1 percent by weight, preferably 0.05 percent by weight to 0.5 percent by weight, of an organic chain transfer agent with a transfer constant K between 0.1 and 50 is added during the suspension polymerization of para-methylstyrene at a yield ranging from 20 percent to 95 percent.

It is known that chain transfer agents or regulating agents can lower the molecular weight of styrene polymers. This fact can be used to prepare polystyrene with improved flowability, whereby from 0.01 percent by weight to 0.05 percent by weight of a regulating agent such as dodecylmercaptan are added to the polymerization mixture. This simple procedure does not achieve the desired goal for expandable poly-para-methylstyrene. If the chain transfer agent is added prior to polymerization, polymer beads containing the blowing agent are obtained, but they suffer from severe shrinkage after expansion and have low dimensional stability after being fused to form shaped foam objects.

The chain transfer agents are added to the polymerization mixture at yields ranging from 20 percent to 90 percent, preferably between 40 percent and 60 percent. Yield is defined as the percent of monomers which have polymerized based on the total amount of monomers used. Yield can be measured, for example, by interrupting the polymerization after a certain time, through the addition of inhibitors, and then determining the amount of unpolymerized monomers.

Chain transfer agents having a transfer constant K (per Vollwert, Grundriss der Makromolekularen Chemie, Springer Verlag 1962, pp. 52 and 71) between 0.1 and 50, preferably between 1 and 30, are used. The following are typically used:
n-dodecylmercaptan: (K=19)
tert-dodecylmercaptan: (K=3)
n-butyl mercaptan: (K=22)
tert-butyl mercaptan: (K=3.6)
carbon tetrabromide: (K=2.2)
pentaphenylethane: (K=2.0)

The plastic beads in accordance with the invention which contain a blowing agent generally have a diameter between 0.2 and 4 mm. They can be pre-expanded using standard methods, e.g., steam, to form the pre-expanded beads in accordance with the invention. These pre-expanded beads can then be fully expanded with conventional processes to form shaped foam objects.

The parts and percentages cited in the examples are by weight.

EXAMPLE 1

A. Polymerization

A mixture comprising 150 parts water, 0.1 part sodium pyrophosphate, 100 parts para-methylstyrene, 7 parts n-butane, 0.45 part benzoyl peroxide and 0.15 part t-butyl perbenzoate (as polymerization initiators) was heated to 90° C. while being stirred in a pressure-tight mixing vessel.

After two hours at 90° C., four parts of a 10 percent aqueous solution of polyvinylpyrrolidone were added.

Stirring then continued for two additional hours at 90° C., then two hours at 100° C., and finally two hours at 120° C. The chain transfer agents were added to the mixing vessel at the times indicated in the table. The resulting granulate with a mean bead diameter of 1.5 mm was separated and dried.

B. Processing

In order to study the expandability, a screen (mesh size 0.1 mm to 0.2 mm) of dimensions 250×800×1000 mm enclosed in a metal frame was employed, said screen being located in a sealed metal housing with a steam feed line (2 bar) and a device for drawing off the steam.

The steam flowed into the pre-expanding equipment from beneath, without a pressure differential through the wire screen with the products to be tested and was then able to escape once again through the steam removal device.

The equipment was first heated approximately five minutes prior to testing. Then, 100 g of the expandable granulate with a bead size ranging from 1.0 to 2.3 mm was uniformly distributed across the wire screen, the system was closed, and the steam valve was opened.

After two minutes the steam valve was once again closed and the metal housing was opened slowly. The freshly pre-expanded material was dried for 24 hours and then the bulk density was determined.

The test was repeated with pre-expansion times of 4, 6, 10, 20 and 30 minutes. The results which were obtained are summarized in the Table.

TABLE

| Chain Transfer Agent | | — | t-DM[1] | t-DM | t-DM | t-DM | n-DM[2] |
|---|---|---|---|---|---|---|---|
| Transfer Constant | K | — | 3 | 3 | 3 | 3 | 19 |
| Amount | Parts | — | 0.05 | 0.1 | 0.3 | 0.5 | 0.3 |
| Time of Introduction | (min.) after 90° C. | — | 180 | 240 | 240 | 240 | 180 |
| Bulk Density after (min) | (g/l) | | | | | | |

TABLE-continued

| Chain Transfer Agent | — | t-DM[1] | t-DM | t-DM | t-DM | n-DM[2] |
|---|---|---|---|---|---|---|
| 2 | 55.9 | 47.5 | 40.2 | 37.9 | 30.1 | 41.4 |
| 4 | 48.6 | 40.8 | 36.1 | 35.1 | 28.9 | 37.0 |
| 6 | 43.9 | 37.1 | 34.2 | 31.3 | 23.8 | 36.4 |
| 10 | 39.3 | 34.1 | 32.0 | 29.7 | 21.4 | 32.8 |
| 20 | 41.1 | 33.9 | 31.8 | 28.4 | 19.9 | 33.1 |
| 30 | 42.0 | 33.9 | 32.1 | 27.5 | 19.2 | 32.9 |

[1] t-DM: tert-dodecylmercaptan
[2] n-DM: n-dodecylmercaptan

EXAMPLE 2

The polymerization mixture in Example 1 was repeated, but at the beginning of polymerization two parts oligostyrene (mean molecular weight $M_n = 1200$), dissolved in the monomer, were added.

Processing continued as in Example 1. Results:

| Density after (min) | |
|---|---|
| 2 | 42.1 (g/l) |
| 4 | 37.8 (g/l) |
| 6 | 32.8 (g/l) |
| 10 | 29.3 (g/l) |
| 20 | 28.1 (g/l) |
| 30 | 29.0 (g/l) |

The embodiments of the invention in which an exclusive privilege or property is claimed are defined as follows:

1. A process for the preparation of expandable plastic beads based on poly-para-methylstyrene containing a blowing agent by the polymerization of para-methylstyrene in an aqueous suspension and the addition of volatile organic blowing agents prior to, during or after polymerization wherein the polymerization is carried out in the presence of an organic chain transfer agent with a transfer constant K between 0.1 and 50 are added as the molecular-weight-regulating substance when a degree of conversion between 20 and 95 percent has been reached.

2. The process of claim 1 wherein 0.01 to 1 percent by weight, based on the monomer of said organic chain transfer agent is employed.

3. The process of claim 1 wherein 0.1 to 10 percent of an oligomer of styrene or para-methylstyrene with an average molecular weight (number average) between 500 and 5000 is added as the molecular-weight-regulating substance.

* * * * *